United States Patent [19]
Jones

[11] 3,767,079
[45] Oct. 23, 1973

[54] PRESSURE VESSEL SEALING ARRANGEMENT

[75] Inventor: Trevor O. Jones, Birmingham, Mich.

[73] Assignee: General Motors Corporation, Detroit, Mich.

[22] Filed: May 10, 1972

[21] Appl. No.: 252,345

[52] U.S. Cl................... 220/89 A, 137/71, 220/47, 220/89 B
[51] Int. Cl........................ F16k 17/14, F16k 17/38
[58] Field of Search 137/68–74; 220/89 A, 89 B, 47; 222/3; 280/150 AB

[56] References Cited
UNITED STATES PATENTS
3,567,245  3/1971  Ekstrom............................ 137/68 X
3,693,644  9/1972  Dilorenzo ............................ 137/71
3,698,411  10/1972  Garrett................................ 137/71

Primary Examiner—Martin P. Schwadron
Assistant Examiner—Richard Gerard
Attorney—W. E. Finken et al.

[57] ABSTRACT

A pressure vessel includes an end wall structure having a combined filling and outlet port in the form of a truncated conical bore therethrough which tapers outwardly toward the vessel interior. A hollow conical seal of frangible material fits within the bore and seats against the bore wall. The seal is displaced from the bore wall to provide a check valve permitting filling of the vessel with pressure fluid through the port and sealingly engages the bore wall under the pressure of the fluid in the vessel after the vessel is filled. An explosive primer or detonator mounted in the apex of the seal breaks the seal when detonated to open the port. The wall of the conical bore guides the fragments of the seal through the port ahead of the outrushing pressure fluid. One or more pressure relief ports extend radially of the bore and communicate with the seal adjacent the basal end thereof. The seal is weakened at this area by an internal groove and ruptures when a predetermined pressure is reached in the vessel to permit the escape of the pressure fluid through the relief ports. The seal may be made of materials which weaken at elevated temperatures to provide for its rupture and release of the pressure fluid through the ports when such temperatures are reached. The seal may also be made of electrically conductive materials to provide a means of sensing maintenance of the sealing arrangement.

5 Claims, 1 Drawing Figure 3,767,079
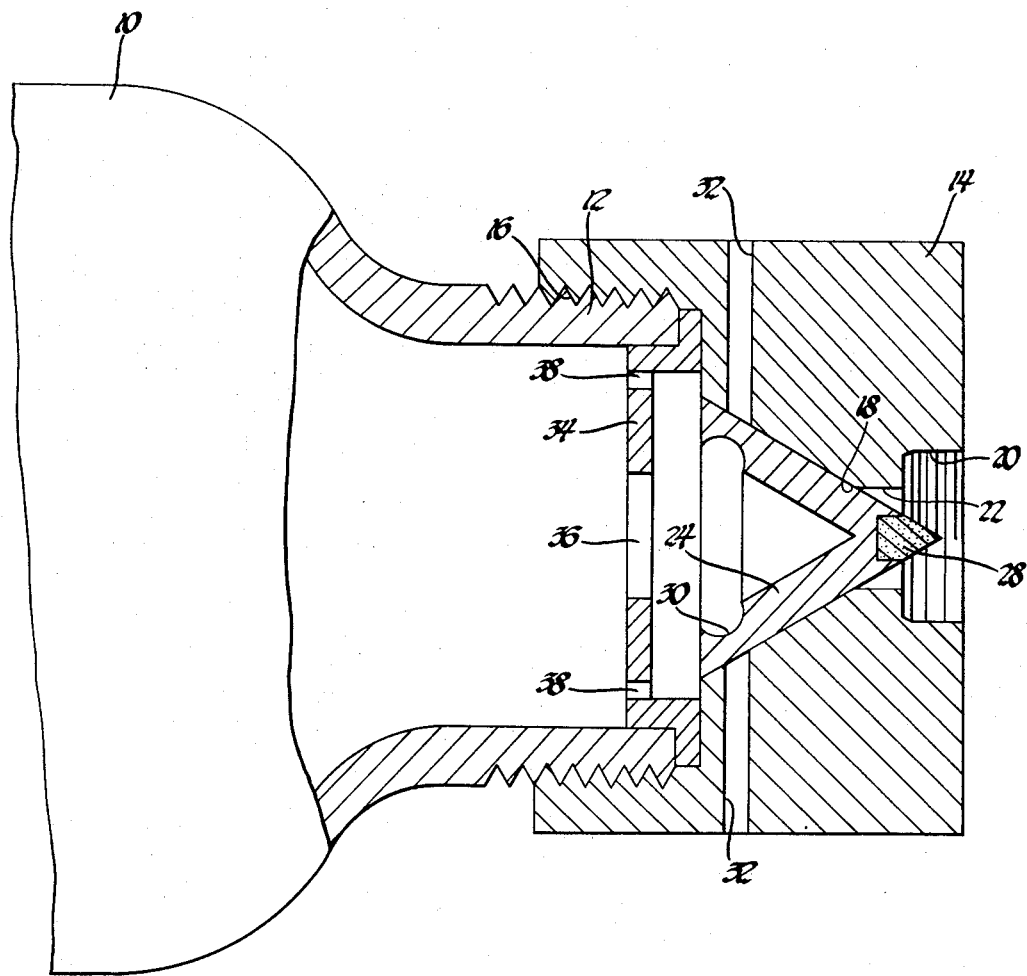

PRESSURE VESSEL SEALING ARRANGEMENT

This invention relates generally to sealing arrangements for pressure vessels and more particularly to a sealing arrangement which provides a check valve for filling of the vessel, a frangible seal for releasing the contents of the vessel upon command, and a pressure and/or temperature relief valve permitting release of the contents of the vessel when predetermined pressures and/or temperature are attained.

Certain vehicle occupant passive restraint systems include a pressure vessel containing pressurized fluid for inflation of a cushion of the system upon command. The pressure vessel is normally sealed by a metal or glass diaphragm. The diaphragm may be broken by a primer or detonator, or in other manners. The sealing arrangement of this invention is particularly intended for use with such pressure vessels although, of course, it has other uses than in occupant restraint systems.

In the preferred embodiment of the invention an end wall structure of the pressure vessel includes a combined filling and outlet port in the form of a truncated conical bore therethrough which tapers outwardly toward the vessel interior. A cone of frangible metal or plastic sealingly engages the wall of the conical bore under the pressure of the pressurized fluid within the vessel. A retaining ring limits the axial movement of the seal out of engagement with the wall of the conical bore to provide a pressure responsive check valve permitting filling of the pressure vessel through the conical bore. An explosive primer is mounted on the apex of the seal and when detonated breaks the seal to release the pressurized fluid from the vessel. The tapered walls of the conical bore guide the fragments of the seal through the axial bore to prevent its obstruction by such fragments. The conical bore also has the effect of providing a passage of predetermined size through which the fragments of the fractured seal are extruded, thereby determining the maximum size of such fragments which pass through the bore. A number of orifices or pressure relief ports are drilled radially through the vessel end wall structure and communicate with the conical seal adjacent the basal end thereof. The seal includes an internal annular groove which weakens the seal opposite the relief ports to provide for seal rupture in response to excess pressure within the vessel. The seal may be constructed of frangible plastic or metal which weakens at elevated temperatures and/or pressures so that it will rupture opposite the pressure relief ports to relieve pressure from the vessel when such temperatures and/or pressures are reached.

One feature of the invention is the provision of a frangible seal for closing the outlet of the pressure vessel which acts as a check valve; i.e. opening to permit filling of the vessel and being closed by the pressure in the vessel.

Another feature of the invention is the provision of a seal of frangible material in hollow conical form which fits within a truncated conical bore and closes a pressure port located at the apical end of the conical bore.

Another feature of the invention is the provision of a frangible pressure vessel seal having weakened wall portions communicating with relief ports to provide a pressure relief valve.

Still another feature of the invention is the provision of a frangible pressure vessel seal of material which weakens when heated, thereby reducing the pressure sustaining capacity of the seal to assure relief of excess pressure in the vessel.

A still further feature of the invention is the provision of a frangible seal in the form of a hollow cone which is received in a conical bore in the vessel to provide adequate pressure sustaining capacity with a minimum of seal wall thickness.

Other features and advantages of the invention will become apparent upon consideration of the specification and the appended drawings in which the single FIGURE is a fragmentary sectional view of a pressure vessel incorporating the invention.

Referring to FIG. 1, a conventional pressure vessel 10 includes an externally threaded cylindrical neck 12. An end wall structure or cap 14 includes a threaded bore 16 which receives neck 12 to attach the cap 14 to the pressure vessel 10. A conical bore 18 in cap 14 opens axially of bore 16 and has its apex truncated by a threaded axial bore 20 so that an outlet port or opening 22 is provided at the juncture of the conical bore 18 and the axial bore 20. A hollow conical seal 24 of frangible plastic or metal fits within the conical bore 18 and is engageable with the wall thereof to block the outlet port 22. The fluid pressure within the vessel acts upon the interior of the wall of the hollow conical seal 24 to force it into sealing engagement with the wall of the conical bore 18 and thereby provide considerable pressure sustaining capacity at outlet port 22 with a minimum of seal wall thickness.

A primer 28 is mounted in the apical end of the conical seal 24. Associated with the primer 28 is appropriate electrical or mechanical or equivalent detonating means well known in the prior art. When detonated, the primer fractures the conical seal 24 and the fluid pressure within the pressure vessel 10 forces the fragments of the fractured seal along the wall of the conical bore 18 and through the outlet port ahead of the outrushing gas, thereby assuring an unobstructed fluid flow path. The conical bore 18 also functions to extrude or break up the fragments of the fractured seal to an extent determined by the size of the outlet port 22, thereby limiting the size of such fragments which impinge against the conventional manifold or diffuser or other passage means connected to the bore 20 and communicating the outlet port 22 with an inflatable occupant restraint cushion or other pressure fluid operated device.

The conical seal 24 includes an internal annular groove 30 adjacent its basal end to weaken the seal opposite the inner openings of passages or relief ports 32 which extend radially through the cap 14. A predetermined excess pressure within the pressure vessel 10 ruptures the frangible seal 24 at the groove 30 and releases fluid within the vessel through the ports 32 to atmosphere. The ports 32 are preferably spaced equally about the axis of cap 14 so that the intense reaction forces generated by escape of high pressure fluid through the relief ports 32 are balanced to minimize the need for restraint of the vessel.

The conical seal 24 may be constructed of a frangible metal or plastic which softens when subjected to high temperature. Such softening of the seal will reduce its pressure sustaining capacity at the groove 30 and accordingly lessen the pressure at which a rupture will occur to relieve pressure from the pressure vessel 10.

As hereinbefore stated, the threaded axial bore 20 of cap 14 permits connection of the pressure vessel 10 to a conventional occupant restraint cushion or other pressure fluid operated device. Threaded bore 22 also facilitates the connection of a pipe for filling the vessel 10. When the pressure vessel 10 is being filled, the pressure of the fluid pushes the seal 24 out of engagement with the wall of conical bore 18. A flanged retaining ring 34 fits within neck 12 and has its flange clamped between the end of the neck and cap 14 to mount the retaining ring 34 in place. Apertures 36 and 38 in the retaining ring 34 permit free flow of fluid into the vessel 10. When the pressure source is disconnected from the bore 20 the pressure within the vessel forces the conical seal 24 back into sealing engagement with the conical bore 22 in check valve fashion. Thus it is seen that the pressure vessel 10 may be filled as well as emptied through the outlet port 22. It is noted that during such filling operation some pressure fluid will escape through the ports 32 but such loss is minimized by appropriately sizing outlet port 22 relative relief ports 32. It will be apparent that the pressure vessel 10 may alternately be filled through the relief ports 32.

The conical seal 24 may be coated with an electrically conductive pressure responsive rubber or plastic such as Uskon, marketed by Uniroyal. Such a coating, when connected to an appropriate read-out device, provides an integral device for measuring the pressure level within the vessel.

What is claimed is:

1. A seal structure for a pressure vessel having an end wall with a first port and a pressure relief port, and comprising a frangible seal located within the pressure vessel and having a first portion engageable with the end wall to seal the first port and a second portion of less pressure sustaining capacity than the first portion engageable with the end wall to seal the pressure relief port, pressure fluid communicated to the first port from outside the pressure vessel urging the frangible seal inwardly and out of engagement with the end wall to permit filling of the pressure vessel through the first port, pressure fluid within the pressure vessel urging the frangible seal outwardly so that the first and second portions of the frangible seal are urged into pressure sealing engagement with the pressure vessel end wall to respectively seal the first port and pressure relief port, the seal being rupturable at its second portion by predetermined pressure within the pressure vessel to exhaust pressure fluid from the pressure vessel through the pressure relief port.

2. A seal structure for a pressure vessel having an outlet port and a pressure relief port, and comprising a frangible seal located within the pressure vessel and having a first portion adapted to seal the outlet port and a second portion of less pressure sustaining capacity than the first portion adapted to seal the pressure relief port, pressure fluid within the pressure vessel urging the first and second portions of the frangible seal outwardly of the vessel into pressure sealing engagement with the pressure vessel to respectively seal the outlet and pressure relief ports, means for rupturing the frangible seal at its first portion to exhaust pressure fluid from the pressure vessel through the outlet port, the frangible seal being constructed of a material which weakens at elevated temperatures whereby the frangible seal ruptures at its second portion in response to a predetermined elevated temperature to exhaust pressure fluid through the pressure relief port.

3. In combination with a pressure vessel having a wall, a combined fill, outlet, and pressure relief valve comprising, a conical bore in the wall of the pressure vessel, a port in the wall of the pressure vessel truncating the apex of the conical bore, a plurality of relief ports extending radially of the bore axis and being equally circumferentially spaced with respect thereto, the relief ports communicating with the conical bore adjacent the basal end thereof, a hollow conical seal of frangible material located within the bore and having an apical portion urged by pressure fluid in the vessel into sealing engagement with the wall of the conical bore to seal the port and seal the relief ports, the basal portion of the hollow conical seal being of lesser thickness than the apical portion thereof to provide a weakened section rupturable by a predetermined pressure within the vessel to exhaust pressure fluid through the relief ports, and means for fracturing the hollow conical seal to release the pressure fluid from the vessel through the port.

4. In combination with a pressure vessel having a wall, a combined fill, outlet, and pressure relief valve comprising, a conical bore in the wall of the pressure vessel, a port in the wall of the pressure vessel truncating the apex of the conical bore, a plurality of relief ports extending radially of the bore axis, the relief ports communicating with the conical bore adjacent the basal end thereof, a hollow conical seal of frangible material located within the bore and having apical and basal portions, pressure fluid within the pressure vessel urging the apical and basal portions of the conical seal into pressure sealing engagement of the wall of the conical bore to respectively seal the port and plurality of relief ports, pressure fluid communicated to the port from outside the vessel urging the conical seal out of sealing engagement with the wall of the conical bore to permit filling of the pressure vessel with pressure fluid communicated to the port, an annular groove in the basal portion of the frangible seal providing a weakened wall section in the conical seal, the weakened wall section being rupturable by predetermined pressure within the pressure vessel to exhaust pressure from the vessel through the pressure relief port, and means for rupturing the frangible seal to release pressure fluid from the vessel through the port.

5. The combination comprising, a pressure vessel containing pressure fluid and having a wall provided with a conical bore, the apex of the conical bore pointing outwardly of the vessel, an outlet port in the wall truncating the apex of the conical bore, a pressure relief port in the wall communicating with the basal portion of the conical bore, a hollow conical seal of frangible material located within the bore and having a first portion adapted to seal the outlet port and a second portion of less pressure sustaining capacity than the first portion adapted to seal the pressure relief port, pressure fluid within the pressure vessel urging the first and second portions of the frangible seal outwardly of the vessel into pressure sealing engagement with the wall of the pressure vessel to respectively seal the outlet and pressure relief ports, the seal being rupturable at its first portion to exhaust pressure from the pressure vessel through the outlet port, the conical bore being effective to guide the fragments of the ruptured seal through the outlet port ahead of the out rushing pressure fluid, and the seal being rupturable at its second portion by predetermined pressure within the pressure vessel to exhaust pressure from the vessel through the pressure relief port.

* * * * *